United States Patent
Burrows et al.

(10) Patent No.: US 10,446,887 B2
(45) Date of Patent: Oct. 15, 2019

(54) BATTERY THERMAL MANAGEMENT SYSTEM INCLUDING THERMAL INTERFACE MATERIAL WITH INTEGRATED HEATER ELEMENT

(71) Applicant: FORD GLOBAL TECHNOLOGIES, LLC, Dearborn, MI (US)

(72) Inventors: Neil Robert Burrows, White Lake Township, MI (US); Steve F. Chorian, Canton, MI (US); George Albert Garfinkel, Westland, MI (US); Dhanunjay Vejalla, Novi, MI (US); Chung-hsing Kuo, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1077 days.

(21) Appl. No.: 14/336,260

(22) Filed: Jul. 21, 2014

(65) Prior Publication Data

US 2016/0020496 A1    Jan. 21, 2016

(51) Int. Cl.
| | |
|---|---|
| *H01M 10/48* | (2006.01) |
| *H01M 10/42* | (2006.01) |
| *H01M 10/625* | (2014.01) |
| *H01M 10/653* | (2014.01) |
| *H01M 10/6571* | (2014.01) |

(Continued)

(52) U.S. Cl.
CPC ............ *H01M 10/486* (2013.01); *B60L 1/02* (2013.01); *B60L 7/12* (2013.01); *B60L 15/20* (2013.01); *B60L 15/2009* (2013.01); *B60L 50/16* (2019.02); *B60L 50/61* (2019.02); *B60L 50/64* (2019.02); *B60L 58/12* (2019.02); *B60L 58/21* (2019.02); *B60L 58/27* (2019.02); *H01M 10/4207* (2013.01); *H01M 10/48* (2013.01); *H01M 10/482* (2013.01); *H01M 10/625* (2015.04); *H01M 10/635* (2015.04); *H01M 10/653* (2015.04); *H01M 10/655* (2015.04);

(Continued)

(58) Field of Classification Search
CPC .. H01M 10/6571; H01M 10/42; H01M 10/48; H01M 10/615; H01M 10/625; H01M 10/482; H01M 10/653; H01M 10/6555; H01M 10/635; H01M 10/655; H01M 10/4207; H01M 10/486; B60L 1/02; B60L 7/12; B60L 11/123; B60L 11/14
See application file for complete search history.

(56) References Cited

U.S. PATENT DOCUMENTS 8,084,154 B2 * 12/2011 Scheucher ............... B60L 8/00
                                                                429/100
8,153,290 B2    4/2012 Hermann et al.

(Continued)

FOREIGN PATENT DOCUMENTS

| CN | 102496751 A | 6/2012 |
|---|---|---|
| CN | 202839778 | * 3/2013 |
| CN | 202839778 U | 3/2013 |

OTHER PUBLICATIONS

CN102496751 MT.*

(Continued)

*Primary Examiner* — Alexander Usyatinsky
(74) *Attorney, Agent, or Firm* — Carlson, Gaskey & Olds

(57) ABSTRACT

A battery pack includes a battery cell, a thermal interface material adjacent the battery cell and a heater element integrated with the thermal interface material.

19 Claims, 4 Drawing Sheets

(51) Int. Cl.

| | | |
|---|---|---|
| *H01M 10/6555* | (2014.01) | |
| *H01M 10/635* | (2014.01) | |
| *H01M 10/655* | (2014.01) | |
| *B60L 1/02* | (2006.01) | |
| *B60L 7/12* | (2006.01) | |
| *B60L 15/20* | (2006.01) | |
| *B60L 50/61* | (2019.01) | |
| *B60L 50/16* | (2019.01) | |
| *B60L 58/12* | (2019.01) | |
| *B60L 58/21* | (2019.01) | |
| *B60L 58/27* | (2019.01) | |
| *B60L 50/64* | (2019.01) | |

(52) U.S. Cl.
CPC ... *H01M 10/6555* (2015.04); *H01M 10/6571* (2015.04); *B60L 2240/12* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *H01M 2010/4271* (2013.01); *H01M 2220/20* (2013.01); *Y02T 10/6217* (2013.01); *Y02T 10/645* (2013.01); *Y02T 10/7005* (2013.01); *Y02T 10/7044* (2013.01); *Y02T 10/7061* (2013.01); *Y02T 10/7077* (2013.01); *Y02T 10/72* (2013.01); *Y02T 10/7275* (2013.01)

(56) References Cited

U.S. PATENT DOCUMENTS

| | | |
|---|---|---|
| 8,541,127 B2 | 9/2013 | Tennessen et al. |
| 8,575,518 B2 | 11/2013 | Walsh |
| 2005/0097669 A1* | 5/2005 | Tobin .................. A61H 35/006 4/622 |
| 2005/0242782 A1* | 11/2005 | Kadouchi ........... H01M 2/1072 320/150 |
| 2006/0068278 A1* | 3/2006 | Bloom .................. H01B 3/025 429/176 |
| 2008/0090137 A1* | 4/2008 | Buck .................... H01M 2/1077 429/120 |
| 2008/0311466 A1* | 12/2008 | Yang .................. H01M 10/486 429/62 |
| 2009/0167253 A1* | 7/2009 | Muraoka ........... H01M 10/0525 320/152 |
| 2009/0208829 A1* | 8/2009 | Howard ............. F28D 15/0233 429/120 |
| 2009/0255917 A1* | 10/2009 | Feichko .................. H05B 3/34 219/386 |
| 2010/0104935 A1* | 4/2010 | Hermann ............ H01M 10/502 429/120 |
| 2010/0151308 A1 | 6/2010 | Hermann et al. |
| 2011/0059347 A1* | 3/2011 | Lee .................... H01M 2/0277 429/120 |
| 2011/0206969 A1* | 8/2011 | Tennessen ................ F28F 1/02 429/120 |
| 2012/0094165 A1* | 4/2012 | Valencia, Jr. ..... H01M 10/0525 429/120 |
| 2013/0288098 A1* | 10/2013 | Hamlett ............. H01M 2/1077 429/120 |

OTHER PUBLICATIONS

DEfinition of sandwiced from Collins English Dictionary.*
CN 202839778 MT (Year: 2013).*
Overlaid definition Web._Mar.*

* cited by examiner

BATTERY THERMAL MANAGEMENT SYSTEM INCLUDING THERMAL INTERFACE MATERIAL WITH INTEGRATED HEATER ELEMENT

TECHNICAL FIELD

This disclosure relates to a battery thermal management system for an electrified vehicle. The battery thermal management system includes a thermal interface material and an integrated heater element adapted to heat one or more battery cells during certain conditions.

BACKGROUND

The need to reduce fuel consumption and emissions in automobiles and other vehicles is well known. Therefore, vehicles are being developed that reduce or completely eliminate reliance on an internal combustion engine. Electrified vehicles are one type of vehicle currently being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

Electrified vehicle batteries are typically constructed of one or more battery arrays that include a plurality of battery cells. It may be necessary to thermally manage the battery cells. For example, the battery cells may need to be cooled during some conditions or heated during other conditions.

SUMMARY

A battery pack according to an example of the present disclosure includes a battery cell, a thermal interface material adjacent the battery cell and a heater element integrated with the thermal interface material.

In a further embodiment of any of the foregoing embodiments, the heater element is a resistive heater wire.

In a further embodiment of any of the foregoing embodiments, the heater element is embedded, bonded, overlaid or printed on the thermal interface material.

In a further embodiment of any of the foregoing embodiments, the heater element is contiguous with a top surface or a bottom surface of the thermal interface material.

In a further embodiment of any of the foregoing embodiments, the thermal interface material is sandwiched between the battery cell and a second battery cell.

In a further embodiment of any of the foregoing embodiments, the heater element is sandwiched between a first layer and a second layer of the thermal interface material.

In a further embodiment of any of the foregoing embodiments, the heater element is arranged in a grid that includes a plurality of heating wires arranged as a meandering loop.

In a further embodiment of any of the foregoing embodiments, the thermal interface material is wrapped around the battery cell.

In a further embodiment of any of the foregoing embodiments, the thermal interface material contacts a cold plate.

A further embodiment of any of the foregoing embodiments includes a control system that monitors at least one temperature condition associated with the battery cell and actuates the heater element if the at least one temperature condition drops below a predefined threshold value.

A battery pack according to an example of the present disclosure includes a battery array that includes a plurality of battery cells, a tray that supports the battery array, a thermal interface material between the tray and the battery array, and a heater element that heats the plurality of battery cells in response to at least one temperature condition dropping below a predefined threshold value.

In a further embodiment of any of the foregoing embodiments, the heater element is integrated with the thermal interface material.

A further embodiment of any of the foregoing embodiments includes a second battery array adjacent to the battery array, the thermal interface material positioned between the tray and each of the battery array and the second battery array.

A further embodiment of any of the foregoing embodiments includes a control system that includes a first sensor that monitors a first temperature condition, a second sensor that monitors a second temperature condition, and a control module that selectively actuates the heater element based on the first temperature condition and the second temperature condition.

A further embodiment of any of the foregoing embodiments includes a cold plate positioned between the thermal interface material and the tray.

A method according to an example of the present disclosure includes monitoring at least one temperature condition of a battery pack that includes a battery cell, a thermal interface material and a heater element integrated with the thermal interface material, and conditioning the battery cell with the heater element if the at least one temperature condition drops below a predefined threshold value.

In a further embodiment of any of the foregoing embodiments, the monitoring step includes sensing a first temperature condition with a first sensor, sensing a second temperature condition with a second sensor and comparing at least one of the first temperature condition and the second temperature condition to the predefined threshold value.

In a further embodiment of any of the foregoing embodiments, the first temperature condition is an ambient temperature condition and the second temperature condition is a temperature condition of the battery cell.

A further embodiment of any of the foregoing embodiments includes ending the conditioning step once the at least one temperature condition exceeds the predefined threshold valve.

In a further embodiment of any of the foregoing embodiments, the conditioning step is executed based on an estimated departure time selected by a vehicle operator.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

A battery thermal management system for an electrified vehicle is detailed in this disclosure. The exemplary battery thermal management system includes a thermal interface material and a heater element that can be integrated with the thermal interface material. The thermal interface material is positioned adjacent to one or more battery cells, and the heater element is actuated to heat the battery cells during certain conditions. For example, the heater element can heat the battery cells during relatively cold conditions. By integrating the heater element with the thermal interface material, heat may be generated and applied in close proximity to the battery cells. These and other features are discussed in greater detail in the paragraphs that follow.

Figure 1:
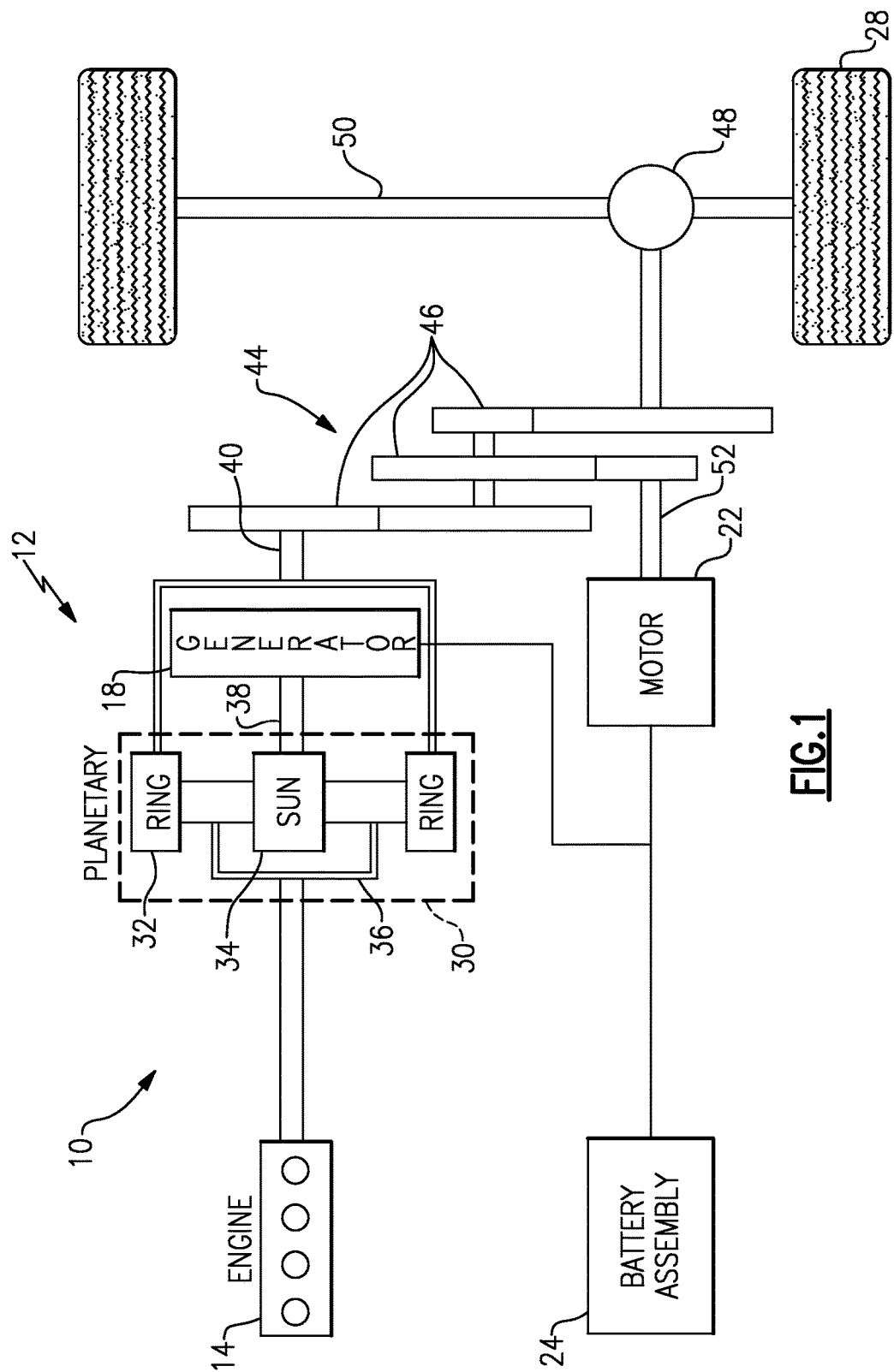
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12.

The engine 14, which could include an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery assembly. The battery assembly 24 may include a high voltage battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
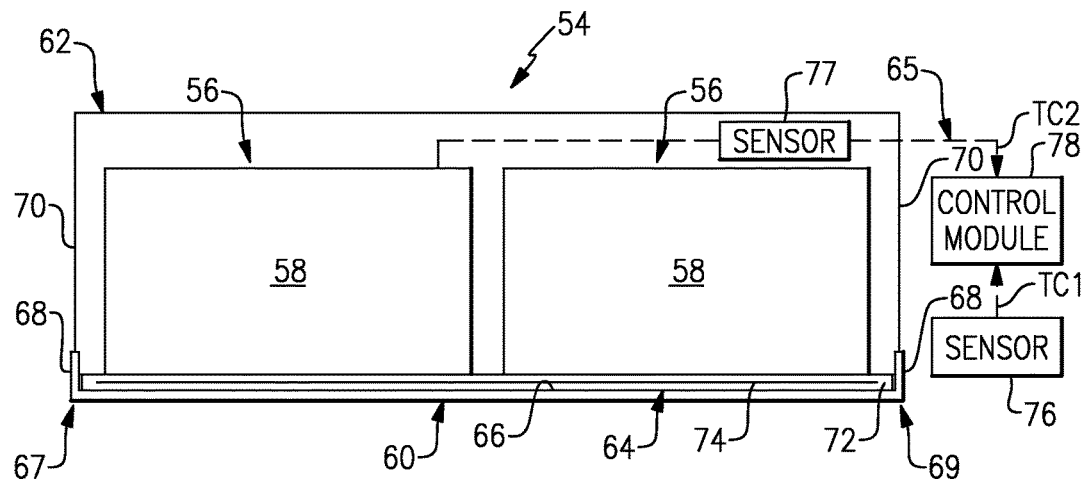
FIG. 2 illustrates a battery pack according to a first embodiment of this disclosure.

FIG. 2 illustrates a battery pack 54 that can be incorporated into an electrified vehicle. For example, the battery pack 54 could be employed within the battery assembly 24 of the electrified vehicle 12 of FIG. 1. The battery assembly 24 may include one or more battery packs 54 for supplying electrical power to components of the electrified vehicle 12. The number of battery packs 54 employed by the battery assembly 24 is not intended to limit this disclosure and could vary depending on vehicle type, among other factors.

One or more battery arrays 56 are mounted inside the battery pack 54. Although two battery arrays 56 are depicted in this embodiment, the battery pack 54 could house any amount of battery arrays 56 within the scope of this disclosure. Each battery array 56 includes a plurality of battery cells 58. The battery cells 58 may be stacked side-by-side and retained relative to one another to build each battery array 56. The battery cells 58 are prismatic, lithium-ion cells, in one non-limiting embodiment. Other types of battery cell may also be utilized.

The battery pack 54 may additionally include a tray 60, a cover 62 and a battery thermal management system 64. The tray 60 is a base of the battery pack 54 and supports the battery arrays 56. In one embodiment, the tray 60 acts as a heat sink to dissipate heat generated by the battery cells 58 during certain vehicle conditions. The tray 60 may include a top surface 66 and walls 68 that extend upwardly from opposite ends 67, 69 of the top surface 66. In another embodiment, the tray 60 is made of a metallic material and is heat and electrical conductive.

The cover 62 is positioned over the tray 60 to house the battery arrays 56 of the battery pack 54. The cover 62 may include a plurality of walls 70 that generally surround the battery arrays 56. Together, the tray 60 and the cover 62 substantially conceal the battery arrays 56.

The battery thermal management system 64 may be employed to thermally condition the battery cells 58 of the battery arrays 56. In one non-limiting embodiment, the battery thermal management system 64 includes a thermal interface material (TIM) 72 and a heater element 74 that is integrated with the TIM 72. The battery thermal management system 64, and in particular the heater element 74, can be utilized during certain conditions to heat the battery cells 58, as discussed in greater detail below.

In one embodiment, the TIM 72 is positioned between the battery cells 58 of the battery arrays 56 and the tray 60. The TIM 72 maintains thermal contact between the battery cells 58 and the tray 60 and may increase the thermal conductivity between these neighboring components during a heat transfer event. The TIM 72 may distribute heat over the complete contact surface between the battery cells 58 and the tray 60. The TIM 72 may extend across an entirety of the top surface 66 of the tray 60. In one non-limiting embodiment, the TIM 72 extends from the end 67 to the end 69 between the walls 68 of the tray 60.

In one embodiment, the TIM 72 is made of an epoxy resin. In another embodiment, the TIM 72 is made of a silicone based material. Other materials may alternatively or additionally be used to form the TIM 72.

The heater element 74 may be integrated with the TIM 72. For example, the heater element 74 could be embedded, printed, bonded or otherwise connected to the TIM 72. In one non-limiting embodiment, the heater element 74 is a resistive heater wire. Other heater elements are also contemplated as within the scope of this disclosure.

The battery thermal management system 64 may additionally include a control system 65 that controls the heating of the battery cells 58. In one embodiment, the control system 65 includes a first sensor 76, a second sensor 77 and a control module 78. The first sensor 76 may be a temperature sensor that senses an ambient temperature condition of the battery pack 54. The first sensor 76 may be mounted at any location near the battery pack 54 but need not be inside the battery pack 54. A signal TC1 representing the sensed ambient temperature condition may be periodically communicated to the control module 78 by the first sensor 76.

The second sensor 77 may be another temperature sensor arranged to sense a temperature condition of one or more battery cells 58 of the battery arrays 56. In one embodiment, the second sensor 77 is mounted inside the battery pack 54, and could be mounted directly to a battery cell 58. Although shown as a single sensor in the highly schematic depiction of FIG. 2, the control system 65 could employ a plurality of sensors for monitoring the temperature conditions of the battery cells 58. In fact, each battery cell 58 could include a sensor. The second sensor 77 may periodically communicate a signal TC2 representing the sensed battery cell temperature condition to the control module 78.

The control module 78 may be part of an overall vehicle system controller (VSC), or could alternatively be a stand-alone control unit separate from the VSC. In one non-limiting embodiment, the control module 78 is a battery electronic control module (BECM). The control module 78 may include a processing unit and non-transitory memory for executing various control strategies associated with the battery thermal management system 64.

In one embodiment, the control module 78 commands the heater element 74 of the battery thermal management system 64 ON if one or both of the signals TC1 and TC2 indicate temperature conditions that are below predefined threshold values stored on the control module 78. The predefined threshold values may be stored in the non-transitory memory of the control module 78, such as in the form of one or more look-up tables. The control module 78 may take one or both of the signals TC1 and TC2 into account when determining whether the battery cells 58 need heated to enable full battery performance during relatively cold conditions.

Figure 3A:
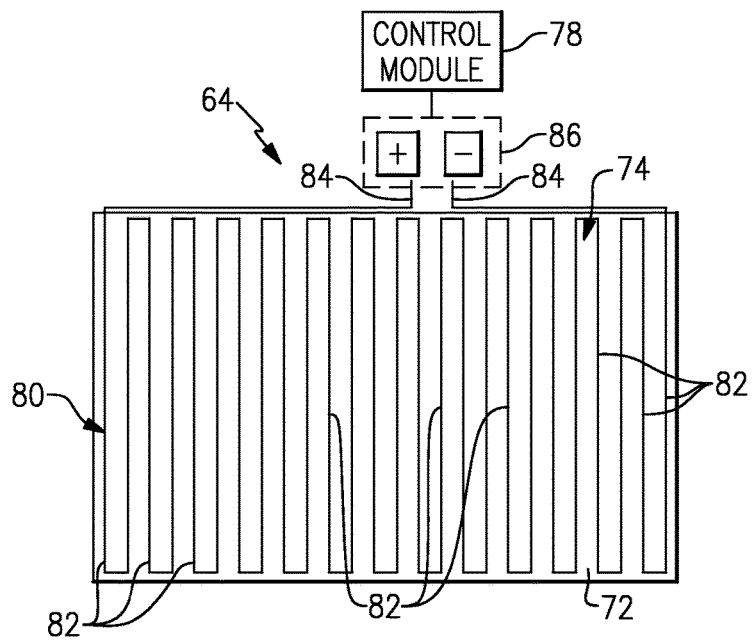
FIG. 3A illustrates a first configuration of a heater element of a battery thermal management system.

FIG. 3A illustrates a plan view of the heater element 74 of the battery thermal management system 64. In this embodiment, the heater element 74 is overlaid or printed on the TIM 72. In another embodiment, the heater element 74 is embedded inside the TIM 72. The heater element 74 may be arranged in a grid 80 that includes a plurality of spaced apart heating wires 82. In one embodiment, the grid 80 is arranged as a meandering loop of heating wires 82. Other configurations are also contemplated, and the configuration of the grid 80 shown in FIG. 3A is not intended to limit this disclosure.

End legs 84 of the heating wires 82 may connect to a current source 86. The current source 86 could be a high voltage battery, a low voltage battery, or an external power source. When commanded by the control module 78, the current source 86 passes current through the heating wires 82 of the heater element 74. The heater element 74 generates heat as the current passes through the heating wires 82. The heat generated by the heater element 74 can be used to heat the battery cells 58 of the battery pack 54.

Figure 3B:
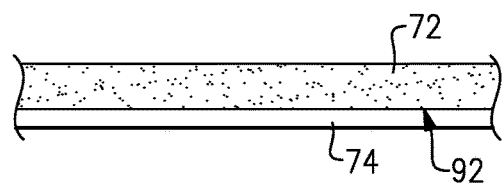
FIG. 3B illustrates a second configuration of a heater element of a battery thermal management system.

In another embodiment, the heater element 74 is positioned beneath the TIM 72 (see FIG. 3B). For example, the heater element 74 may be contiguous with a bottom surface 92 of the TIM 72.

Figure 3C:
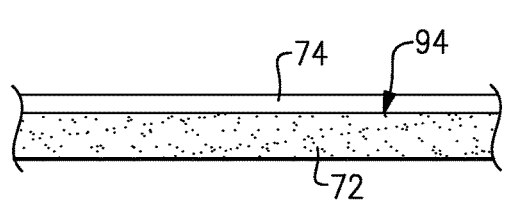
FIG. 3C illustrates a third configuration of a heater element of a battery thermal management system.

In yet another embodiment, the heater element 74 is positioned on top of the TIM 72 (see FIG. 3C). For example, the heater element 74 may be contiguous with a top surface 94 of the TIM 72.

Figure 3D:
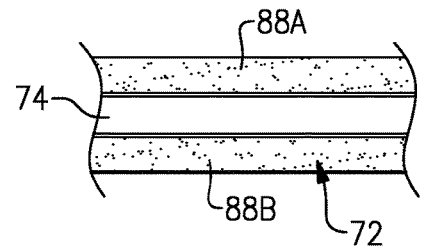
FIG. 3D illustrates a fourth configuration of a heater element of a battery thermal management system.

In yet another embodiment, the heater element 74 is sandwiched between a first layer 88A and a second layer 88B of the TIM 72 (see FIG. 3D). This is one example of how the heater element 74 could be embedded inside the TIM 72.

Of course, the exemplary embodiments of FIG. 3A-3D are intended to be non-limiting. That is, other configurations are also contemplated as within the scope of this disclosure.

Figure 4:
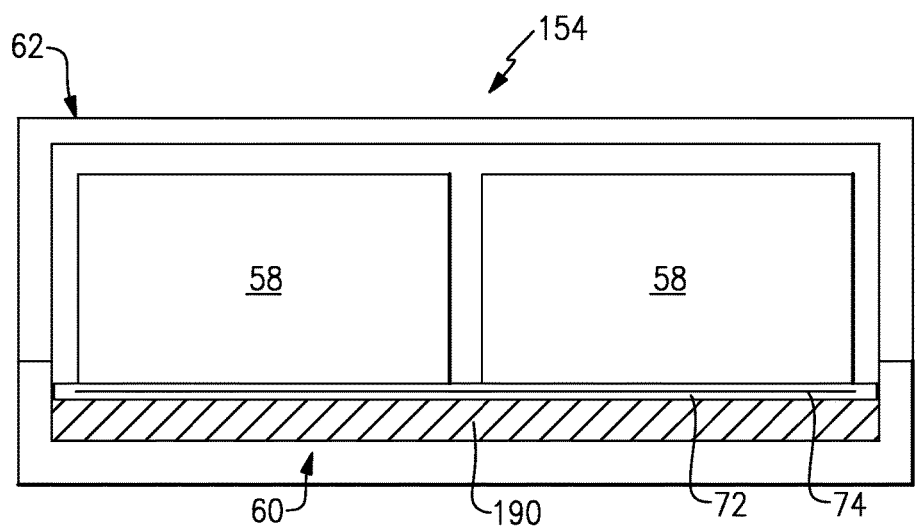
FIG. 4 illustrates a battery pack according to a second embodiment of this disclosure.

FIG. 4 illustrates a battery pack 154 according to another embodiment of this disclosure. In this disclosure, like reference numbers designate like elements were appropriate and reference numerals with the addition of 100 or multiples thereof designate modified elements that are understood to incorporate the same features and benefits of the corresponding original elements.

The battery pack 154 of this embodiment is substantially similar to the battery pack 54 of FIG. 2. However, in this embodiment, the battery pack 154 incorporates a cold plate 190. In one embodiment, the cold plate 190 is positioned between a tray 60 and a TIM 72 of the battery pack 154. The cold plate 190 may function to remove heat from the battery cells 58 during certain conditions.

Figure 5:
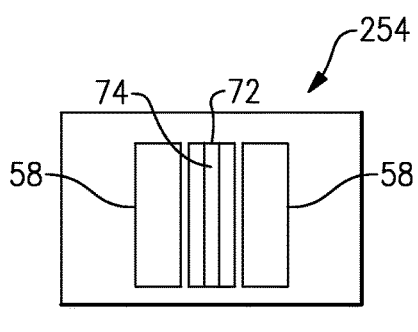
FIG. 5 illustrates another battery pack.
Figure 6:
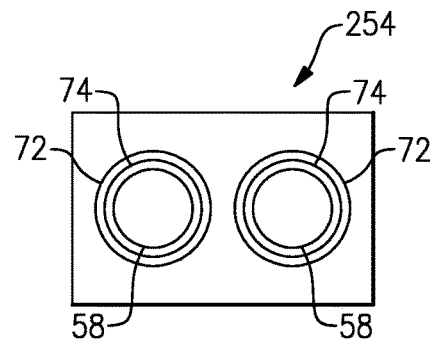
FIG. 6 illustrates yet another battery pack.

FIG. 5 illustrates yet another battery pack 254. In this embodiment, the battery pack 254 includes battery cells 58 that are separated by a TIM 72. The TIM 72 includes an integrated heater element 74. The heater element 74 may be selectively actuated to heat the side surfaces of the battery cells 58. The battery cells 58 may be prismatic or pouch type cells. In another embodiment, the battery cells 58 are cylindrical cells and the TIM 72 is at least partially wrapped around the battery cells 58 (see, e.g., FIG. 6).

Figure 7:
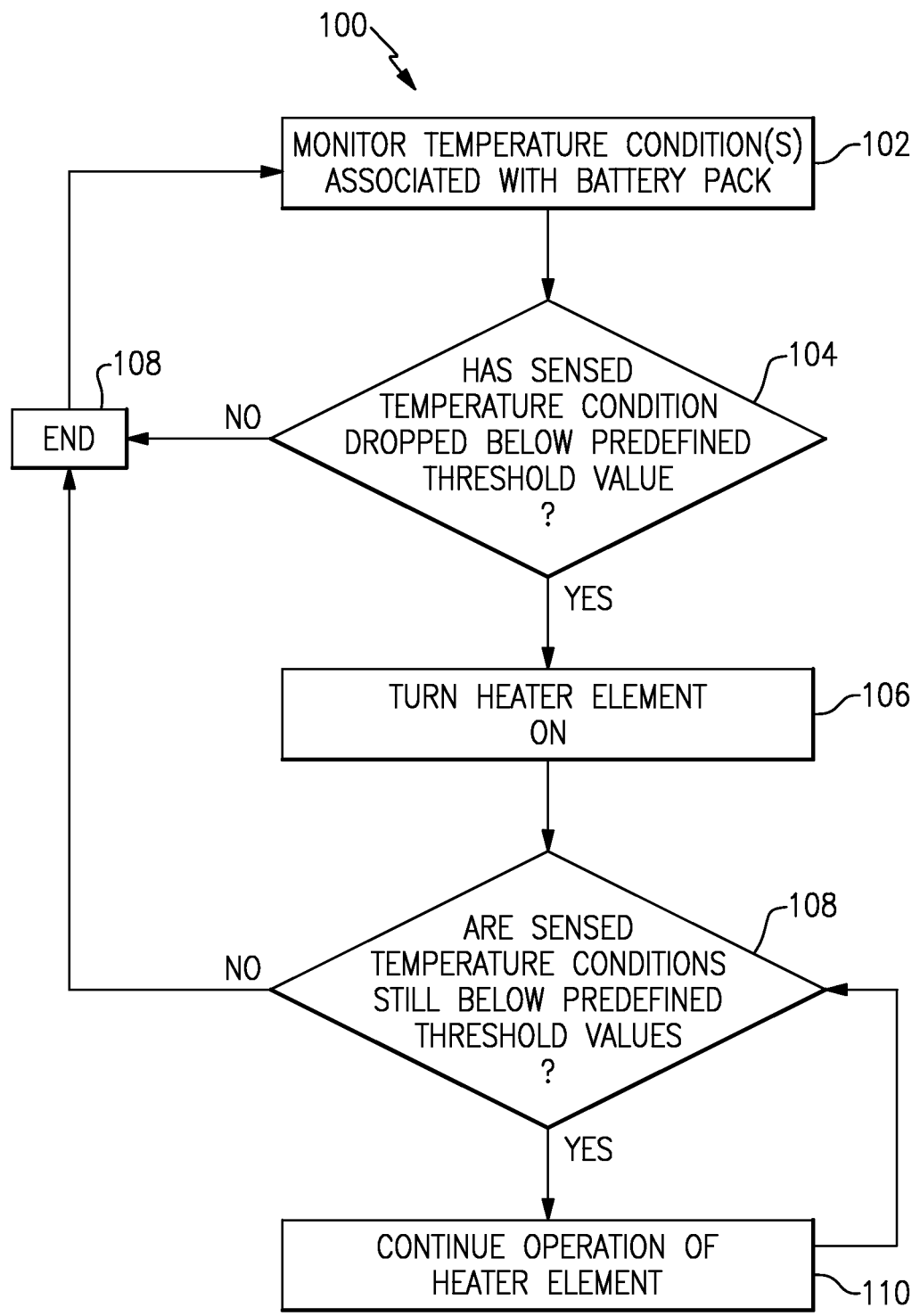
FIG. 7 schematically illustrates an exemplary control strategy for operating a battery thermal management system.

FIG. 7, with continued reference to FIGS. 1-6, schematically illustrates a control strategy 100 for operating a battery thermal management system 64. For example, the control strategy 100 may be executed during certain conditions to heat the battery cells 58 of the battery pack 54 (or the battery pack 154). Of course, the battery thermal management system 64 is capable of implementing and executing other control strategies within the scope of this disclosure. In one embodiment, the control module 78 of the control system 65 of the battery thermal management system 64 is programmed with one or more algorithms adapted to execute the control strategy 100, or any other control strategy.

As shown in FIG. 7, the control strategy 100 may begin at block 102 by monitoring one or more temperature conditions associated with the battery pack 54. In one embodiment, the sensors 76, 77 of the control system 65 may monitor one or more temperature conditions of the battery pack 54 and communicate signals (e.g., signals TC1 and TC2) to the control module 78. The signal TC1 may represent ambient temperature conditions and the signal TC2 may represent battery cell temperature conditions, in one non-limiting embodiment.

At block 104, the control strategy 100 determines whether the sensed temperature condition(s) has fallen below a predefined threshold value. In one non-limiting embodiment, the control module 78 may compare the temperature information received from the sensors 76, 77 with stored predefined threshold values, such as within a look-up table stored in non-transitory memory. The predefined threshold value may be defined at a temperature that indicates that the battery cells 58 require heating. This could vary depending on the climate the vehicle is operated in, and/or could vary depending on the internal cabin temperature, among other criteria.

If the sensed temperature conditions have dropped below the predefined threshold value(s), the control strategy proceeds to block 106. However, if the sensed temperature conditions exceed the predefined threshold values, the control strategy 100 determines that the battery cells 58 do not require heating and ends at block 108.

The control strategy 100 may actuate the heater element 74 ON to heat the battery cells 58 at block 106. Next, at block 108, the control strategy 100 determines whether updated temperature conditions are still below the predefined threshold values. If so, the heater element 74 remains ON at block 110. If not, the control strategy ends at block 108, such as by switching the heater element OFF.

In another embodiment, the control module 78 of the control system 65 can be programmed to determine when to start heating the battery cells 58 and what the target temperature of the battery cells 58 should be. For example, the control module 78 could be programmed to calculate when to start heating the battery cells 58 with the heater element 74 based on an estimated departure time selected by a vehicle operator by taking advantage of an on-plug energy source that does not deplete the energy of the battery pack during heating. The sensors 76, 77 may continuously monitor temperature conditions and communicate with the control module 78 for making such a determination.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a battery cell;
   a thermal interface material adjacent said battery cell, wherein said thermal interface material includes an epoxy resin or a silicone based material; and
   a heater element integrated with said thermal interface material, wherein said heater element is a resistive heater wire that is embedded, bonded, overlaid, or printed on said thermal interface material.

2. The battery pack as recited in claim 1, wherein said thermal interface material is sandwiched between said battery cell and a second battery cell.

3. The battery pack as recited in claim 1, wherein said heater element is sandwiched between a first layer and a second layer of said thermal interface material.

4. The battery pack as recited in claim 1, wherein said heater element is arranged in a grid that includes a plurality of heating wires arranged as a meandering loop.

5. The battery pack as recited in claim 4, wherein said thermal interface material is wrapped around said battery cell.

6. The battery pack as recited in claim 1, wherein said thermal interface material contacts a cold plate.

7. The battery pack as recited in claim 1, comprising a control system that monitors at least one temperature condition associated with said battery cell and actuates said heater element if said at least one temperature condition drops below a predefined threshold value.

8. The battery pack as recited in claim 1, comprising a control system that includes a control module, a first sensor, and a second sensor.

9. The battery pack as recited in claim 8, wherein said first sensor is configured to sense an ambient temperature of said battery pack and said second sensor is configured to sense a temperature of said battery cell.

10. The battery pack as recited in claim 9, wherein said control module is configured to actuate said heater element based on said ambient temperature and said temperature of said battery cell.

11. The battery pack as recited in claim 1, wherein said thermal interface material is positioned between said battery cell and a cold plate.

12. The battery pack as recited in claim 1, wherein said heater element includes a meandering loop of resistive heater wires.

13. The battery pack as recited in claim 1, wherein said heater element includes a heating wire having end legs that extend away from said thermal interface material.

14. The battery pack as recited in claim 13, wherein said end legs connect to a current source that is configured to pass a current through said heating wire.

15. A battery pack, comprising:
a battery cell;
a thermal interface material adjacent to said battery cell, wherein said thermal interface material includes an epoxy resin or a silicone based material;
a resistive heater wire embedded, bonded, overlaid, or printed on said thermal interface material;
a current source configured to pass a current through said resistive heater wire to heat said battery cell; and
a control module configured to command said current source to pass said current when a temperature of said battery cell drops below a predefined threshold value.

16. The battery pack as recited in claim 1, comprising:
a second battery cell;
said thermal interface material separates said battery cell and said second battery cell; and
wherein said heater element is selectively actuated to heat a side surface of each of said battery cell and said second battery cell.

17. The battery pack as recited in claim 1, wherein said resistive heater wire is overlaid onto said thermal interface material.

18. The battery pack as recited in claim 1, wherein said resistive heater wire is bonded to said thermal interface material.

19. The battery pack as recited in claim 1, wherein said resistive heater wire is printed on said thermal interface material.

* * * * *